US010670475B2

(12) United States Patent
Kendig et al.

(10) Patent No.: US 10,670,475 B2
(45) Date of Patent: Jun. 2, 2020

(54) METHOD AND SYSTEM FOR THERMAL IMAGING WITH OPTICAL EMISSIONS FROM A DEVICE UNDER TEST

(71) Applicant: Microsanj, LLC, Santa Clara, CA (US)

(72) Inventors: Dustin Kendig, Fremont, CA (US); Ali Shakouri, West Lafayette, IN (US); Hamid Piroozi, Fishers, IN (US); James Christofferson, Santa Clara, CA (US)

(73) Assignee: MICROSANJ, LLC, Santa Clara, CA (US)

( * ) Notice: Subject to any disclaimer, the term of this patent is extended or adjusted under 35 U.S.C. 154(b) by 305 days.

(21) Appl. No.: 15/825,025

(22) Filed: Nov. 28, 2017

(65) Prior Publication Data

US 2018/0156673 A1 Jun. 7, 2018

Related U.S. Application Data

(60) Provisional application No. 62/429,468, filed on Dec. 2, 2016.

(51) Int. Cl.
| G01K 11/12 | (2006.01) |
| H04N 5/225 | (2006.01) |
| G06K 9/62 | (2006.01) |
| H04N 5/372 | (2011.01) |
| H04N 5/30 | (2006.01) |

(52) U.S. Cl.
CPC .......... *G01K 11/125* (2013.01); *G06K 9/6202* (2013.01); *H04N 5/2256* (2013.01); *H04N 5/30* (2013.01); *H04N 5/372* (2013.01)

(58) Field of Classification Search
CPC .. G01K 11/125; G06K 9/6202; H04N 5/2256; H04N 5/30; H04N 5/372
See application file for complete search history.

(56) References Cited

U.S. PATENT DOCUMENTS

| 4,455,741 A * | 6/1984 | Kolodner | G01N 25/72 250/458.1 |
| 7,173,245 B2 * | 2/2007 | Shakouri | G01J 5/00 250/339.1 |
| 2002/0126732 A1 * | 9/2002 | Shakouri | G01J 5/00 374/130 |
| 2005/0063453 A1 * | 3/2005 | Camm | G01J 5/0003 374/161 |

(Continued)

*Primary Examiner* — Lisa M Caputo
*Assistant Examiner* — Philip L Cotey (57) ABSTRACT

A method for determining change in temperature of an electromagnetically radiating device between un-energized and energized states without contacting the device is disclosed. The method includes establishing a reference image form the device by illuminating the device with an optical signal having a first optical characteristic and capturing the reference image from the device in an un-energized state, establishing an on image form the device by illuminating the device in an energized state, and establishing a modified on image form the device by illuminating the device in the energized state with a modified optical signal having a third illuminating optical characteristic, and comparing the reference image, the on image, and the modified on image to establish changes in reflection as a result of changes in temperature of the device during energization.

19 Claims, 4 Drawing Sheets

(56) References Cited

U.S. PATENT DOCUMENTS

| | | | |
|---|---|---|---|
| 2006/0203122 A1* | 9/2006 | Tokuyama | H04N 5/2256 348/370 |
| 2011/0090342 A1* | 4/2011 | Myrick | G01J 3/433 348/164 |
| 2011/0309754 A1* | 12/2011 | Ashdown | H05B 33/0818 315/151 |
| 2012/0327970 A1* | 12/2012 | Haw | G01J 5/06 374/121 |
| 2013/0076936 A1* | 3/2013 | Yoshida | H04N 5/23219 348/222.1 |
| 2015/0358560 A1* | 12/2015 | Boulanger | H04N 5/332 348/164 |
| 2016/0146895 A1* | 5/2016 | Yazami | B60L 58/34 324/426 |
| 2018/0143084 A1* | 5/2018 | Diether | G01D 3/022 |

* cited by examiner

METHOD AND SYSTEM FOR THERMAL IMAGING WITH OPTICAL EMISSIONS FROM A DEVICE UNDER TEST

CROSS-REFERENCE TO RELATED APPLICATIONS

The present U.S. patent application is related to and claims the priority benefit of U.S. Provisional Patent Application Ser. No. 62/429,468, filed 2 Dec. 2016, the contents of which are hereby incorporated by reference in their entirety into the present disclosure.

TECHNICAL FIELD

The present application relates to non-contact thermal measurements, and more particularly to thermoreflectance based measurement methods and systems.

BACKGROUND

This section introduces aspects that may help facilitate a better understanding of the disclosure. Accordingly, these statements are to be read in this light and are not to be understood as admissions about what is or is not prior art.

The field of non-contact thermal imaging is associated with a variety of applications, e.g., measuring thermal characteristics of an electronic device under test. Thermal imaging using thermoreflectance has received attention in recent years. Thermoreflectance-based imaging is dependent on the measurement of the relative change in the sample's surface reflectivity as a function of temperature. As the temperature of a sample changes, the refractive index, and therefore, the reflectivity also changes. The change in reflectivity is dependent on the Thermoreflectance Coefficient, a basic material property that is a function of the illumination wavelength, the sample material and material surface characteristics, and the ambient temperature. U.S. Pat. No. 7,173,245 to Shakouri et al., incorporated by reference in its entirety into the present disclosure, describes such systems and methods.

In one method, an optical signal can be used to illuminate an electromagnetically radiating device that is energized. However, electromagnetic emission from the device under test while in the energized state can play havoc with thermoreflectance measurements.

There is, therefore an unmet need for a novel method and system that can perform thermoreflectance measurements while not affected by the stray electromagnetic emission of a device under test when the device is energized.

SUMMARY

A method for determining change in temperature of an electromagnetically radiating device between un-energized and energized states without contacting the device is disclosed. The method includes establishing a reference image form the device by illuminating the device with an optical signal having a first optical characteristic and capturing the reference image from the device in an un-energized state, establishing an on image form the device by illuminating the device in an energized state, and establishing a modified on image form the device by illuminating the device in the energized state with a modified optical signal having a third illuminating optical characteristic, and comparing the reference image, the on image, and the modified on image to establish changes in reflection as a result of changes in temperature of the device during energization.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

A new method and system for obtaining temperature maps of various electromagnetically emitting samples, e.g., electronic and optoelectronic devices and integrated circuits, using the thermoreflectance imaging technique are disclosed.

Figure 1:
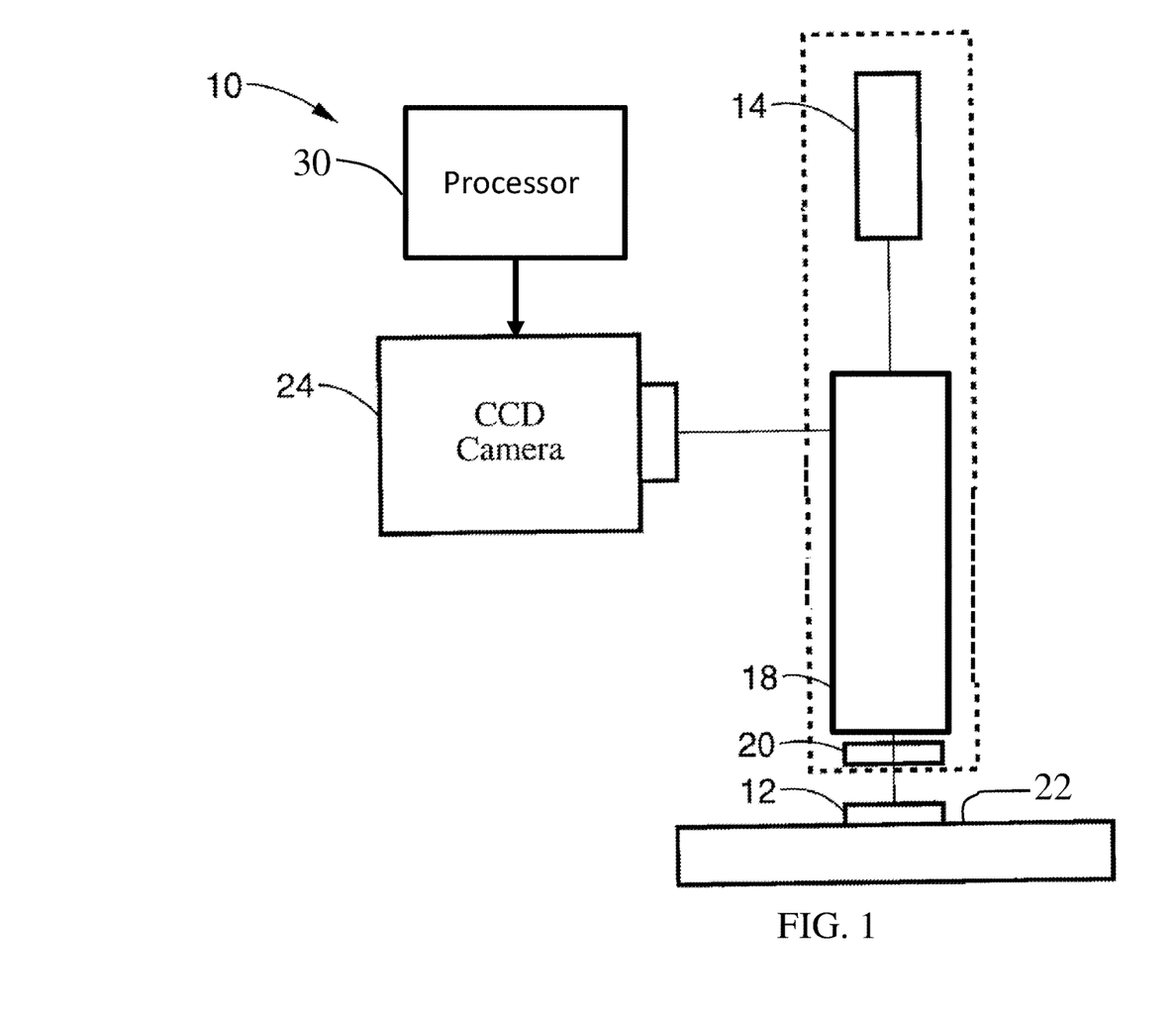
FIG. 1 is a schematic of a thermoreflectance imaging system including an x-y translation stage on which a sample is placed.

Referring to FIG. 1, a system 10 for thermoreflectance imaging is depicted. An illumination source is provided by laser or light emitting diode (LED) 14 whose light beam is directed onto sample 12 through optical components 18, and an objective lens 20, which are all preferably located on an x-y translation stage 22. The x-y translation stage is configured to position the sample 12 according to a set of coordinates and to set the temperature of the stage 22. The reflected light is therefore send to an imager, exemplified as CCD camera 24, or other photo detectors known to a person having ordinary skill in the art. The use of CCD camera 24 within the setup allows optical positioning of the illumination, such as the spot from the laser beam, onto sample 12 while viewing the sample under test. The CCD camera 24 is in turn coupled to a processor 30 configured to control activation of the sample 12, the CCD camera 24, the x-y translation stage (both position and thermal energy) and processing, as described below. The laser or LED 14 can be a semiconductor type, e.g. from THORLABS, operating at ranges from about 300 nm to about 2000 nm. The laser or LED 14 can be operating at ranges from about 1 mW to about 100 mW.

According to the teachings of the present disclosure a method is described that addresses the shortcomings of the prior art, particularly challenges associated with electromagnetic emission of an electromagnetically radiating device under test (DUT) while in an energized state causing inaccuracies with thermoreflectance emission.

Figure 2:
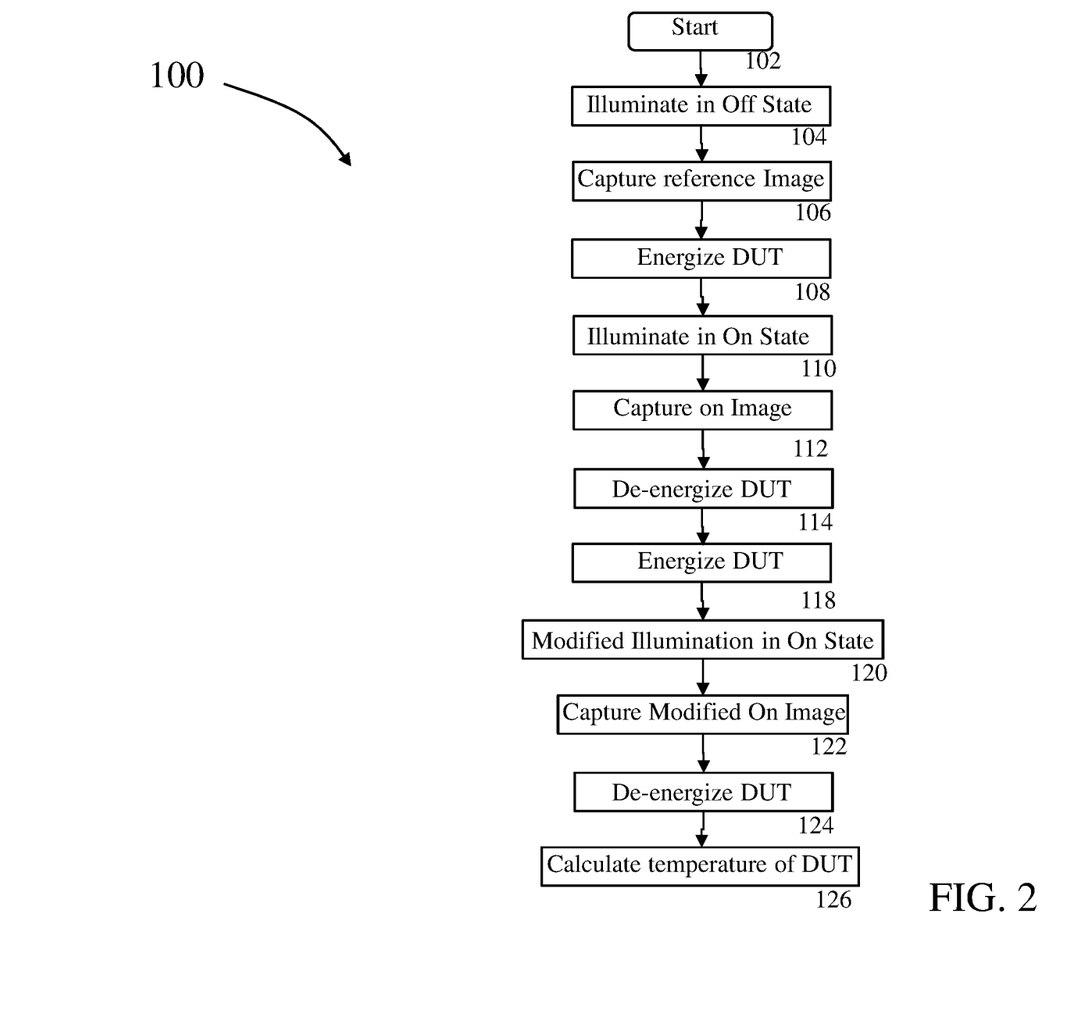
FIG. 2 is a flow chart listing the steps according to the method of the present disclosure.

Referring to FIG. 2, a flow chart 100 is provided depicting steps according to the present disclosure for calculating temperature of the DUT while accounting for stray electromagnetic emission from the device in the on state. The flow chart 100 starts at block 102. In block 104, the processor 30 (see FIG. 1) illuminates the DUT with an optical signal having a first optical characteristic while the device is in the off state. Actions described in the flow chart 100 are typically commanded by the processor in connection with other peripheral devices such as the CCD camera 24, or other peripheral devices discussed herein. In block 106, one or more reference images are captured. In block 108 the DUT is energized by providing a pule with a predetermined pulse width and magnitude to the DUT. This state constitutes the "on state" of the DUT. In block 110, the DUT is illuminated with an optical signal having a second optical characteristic while the device is in the on state. In block 112, one or more images are captured representing images of the DUT in the on state. In block 114, the DUT is de-energized. Steps in blocks 108-114 may be repeated a plurality of times for purpose of averaging images in the on state. In block 118 the DUT is energized by placing it in the on state. In block 120, the DUT is illuminated with an optical signal having a third optical characteristic while the device is in the on state. In block 122, a modified on state image is captured followed by de-energizing the DUT in block 124. Steps in blocks 118-124 may be repeated a plurality of times for purpose of averaging images in the modified on state. Finally, in step 126 change in temperature of the DUT is calculated.

Figure 3:
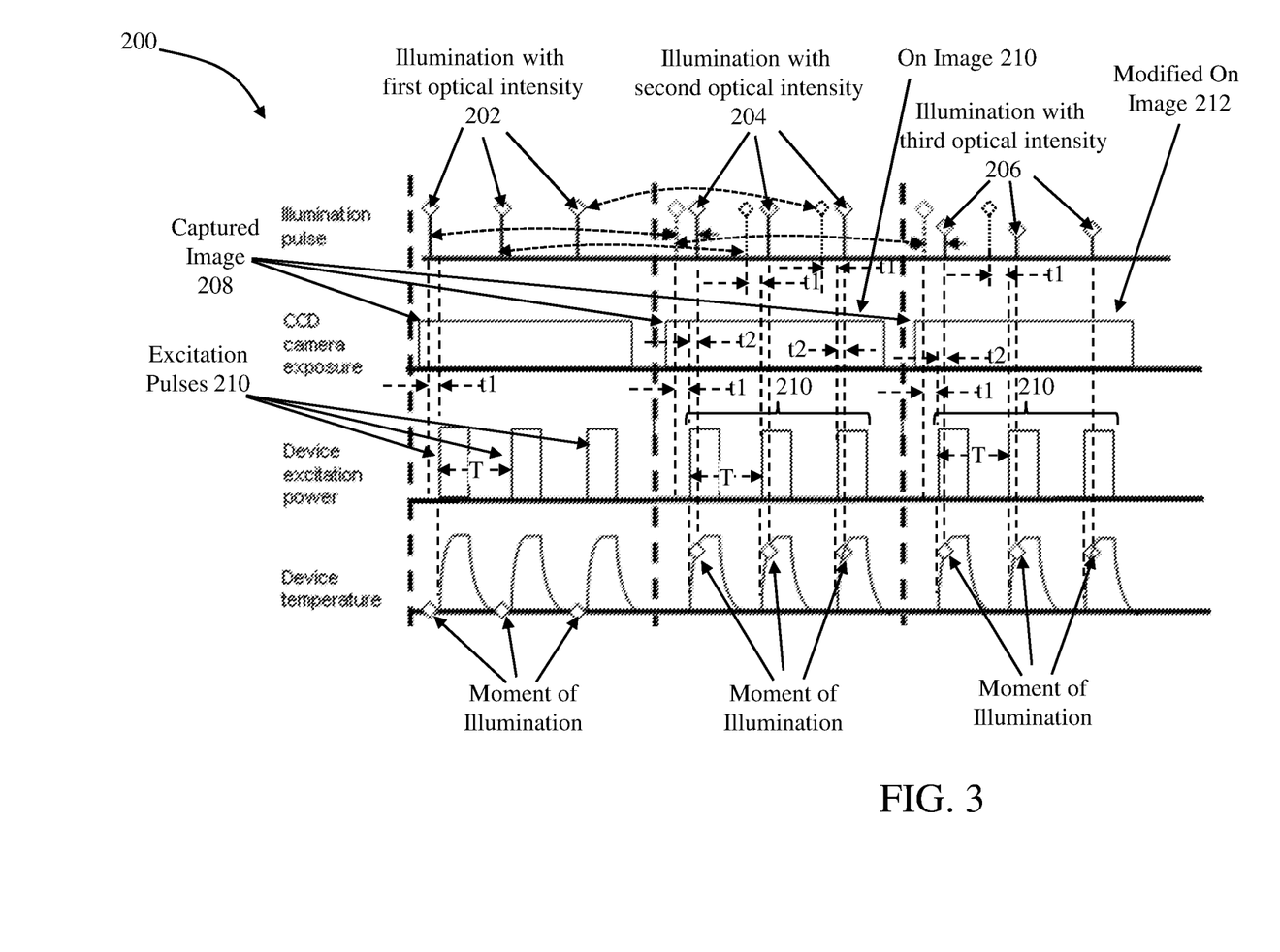
FIG. 3 is a set of timing charts according to the present disclosure.

Referring to FIG. 3, timing diagrams 200 associated with the various states discussed in FIG. 2 are provided. According to one embodiment, a first optical characteristic train of pulses 202 is represented by illuminations having a first optical intensity, the second optical characteristic 204 train of pulses is represented by illuminations having a second optical intensity, and the third optical characteristic 206 train of pulses is represented by illuminations having a third optical intensity. Although illumination intensity is the variable in the first, second and third optical characteristic (202, 204, and 206), other optical variables can be chosen, e.g., wavelength, or other optical variables known to a person having ordinary skill in the art, or a combination thereof, as discussed below. According to one embodiment, the first illumination optical intensity equals the second illumination optical intensity, and wherein the third illumination optical intensity is a factor "a" smaller than the second illumination optical intensity. In FIG. 3, first, second and third optical characteristic trains of pulses (202, 204, and 206) are each shown three individual pulses (but the number can vary between 1 and 1000) in a train of pulses having a period of T, repeating their associated characteristics for averaging purposes.

Three captured images 208 are obtained from the DUT starting from a time prior to the illumination with respect to each of the first, second and third optical characteristic trains of pulses (202, 204, and 206) until a time after the last illumination of the associated train of pulses.

The DUT is excited with an excitation pulse (three pulses shown but can vary between 1 to 1000 corresponding to the number of illuminations) with a train of pulses 210 having the period T corresponding to each of the first, second and third optical characteristic trains of pulses (202, 204, and 206), each excitation occurs a t1 time after each of a corresponding first optical characteristic illumination pulse in the pulse train or the same time t1 after a time corresponding to an imaginary pulse of the first optical characteristic train of pulses would have occurred (correspondence is depicted with dotted double arrow curved lines).

During the second and third optical characteristic trains of pulses (204 and 206), the illumination (204 or 206) occurs t2 time after the beginning of the excitation pulses 210. The moment of illumination is therefore during these trains of pulses (204 and 206) occur after the device temperature has begun to increase as shown in the bottom set of graphs.

Consequently, a change in temperature is represented by:

$$\Delta T = C_{th}\left(\frac{I_3 - I_2}{a - 1} - I_1\right), \quad (1)$$

wherein, $\Delta T$ is a map of the change in temperature of the DUT between the electrically un-energized and energized states, $I_3$ is a third reflection optical intensity associated with the third illumination optical intensity, $I_2$ is a second reflection optical intensity associated with the second illumination optical intensity, $I_1$ is a first reflection optical intensity associated with the first illumination optical intensity, and $C_{th}$ is a pixel-by-pixel thermoreflectance coefficient which is a material property, known for the DUT.

According to another embodiment (not shown), the first optical characteristic is represented by a first illumination wavelength, the second optical characteristic is represented by a second illumination wavelength, the third optical characteristic is represented by a third illumination wavelength, wherein a first reflection optical intensity corresponding to the first illumination equals a second third reflection optical intensity corresponding to the second illumination, and wherein the third reflection optical intensity corresponding to the third illumination is a factor "a" smaller than that of the second reflected light intensity, and the change in temperature is represented by:

$$\Delta T = \left(\frac{C_{th,3}I_3 - C_{th,2}I_2}{a\left(\frac{C_{th,3}}{C_{th,1}}\right) - \left(\frac{C_{th,2}}{C_{th,1}}\right)} - C_{th,1}I_1\right), \quad (2)$$

wherein, $\Delta T$ is the map of the change in temperature of the electromagnetically radiating device between the electrically un-energized and energized states, $I_3$ is the third reflection optical intensity associated with the third illumination wavelength, $I_2$ is the second reflection optical intensity associated with the second illumination wavelength, $I_1$ is the first reflection optical intensity associated with the first illumination wavelength, and $C_{th,i}$ is a pixel-by-pixel thermoreflectance coefficient at wavelength i (i=1 for the first reflection, i=2 for the second reflection, i=3 for the third reflection), which is a material property, known for the DUT.

Using the approach shown and described herein, the temperature of the device can be calculated by calculating the $\Delta T$ by using a method that determines change in temperature of an electromagnetically radiating device between un-energized and energized states without contacting the device.

Figure 4:
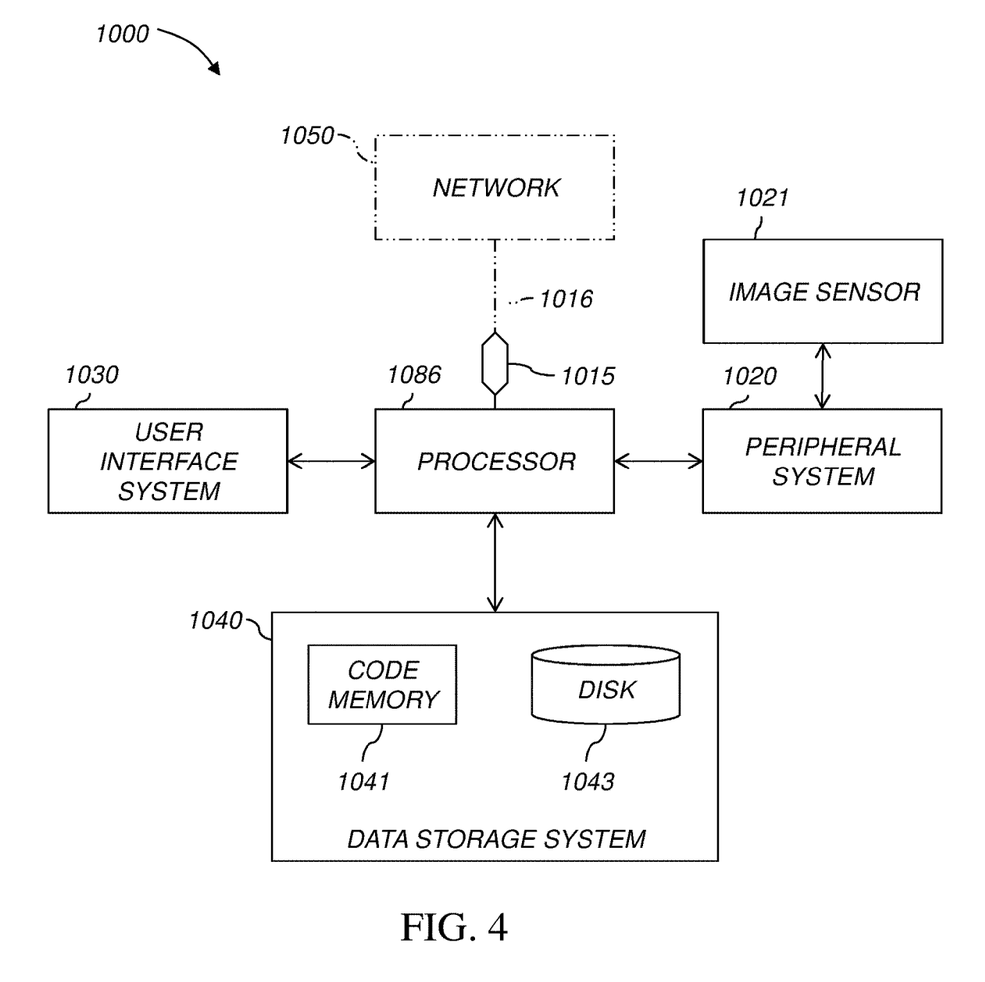
FIG. 4 is a high-level diagram showing the components of an exemplary data-processing system 1000 for analyzing data and performing other analyses described herein, and related components.

Referring to FIG. 4, a high-level diagram showing the components of an exemplary data-processing system 1000 for analyzing data and performing other analyses described herein, and related components. The system includes a processor 1086 (identified as 30 in FIG. 1), a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modern cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those skilled in the art will recognize that numerous modifications can be made to the specific implementations described above. The implementations should not be limited to the particular limitations described. Other implementations may be possible.

The invention claimed is:

1. A method for determining change in temperature of an electromagnetically radiating device between un-energized and energized states without contacting the device, comprising:
    establishing a reference image from an unexcited electromagnetically radiating device by illuminating the device with an optical signal having a first optical characteristic and capturing the reference image from the device in an un-energized state;
    establishing an on image from the electromagnetically radiating device by illuminating the device in an energized state—energized with an electrical pulse train having a predetermined pulse width and pulse magnitude—with an optical signal having a second illuminating optical characteristic provided a predetermined time after beginning of a first pulse in the pulse train and capturing the on image from the device;
    establishing a modified on image from the electromagnetically radiating device by illuminating the device in the energized state with a modified optical signal having a third illuminating optical characteristic provided at the predetermined time after beginning of a second pulse in the pulse train and capturing the modified on image from the device, wherein the third optical characteristic is different than the second optical characteristic; and
    comparing the reference image, the on image, and the modified on image to establish changes in reflection as a result of changes in temperature of the device during energization.

2. The method of claim 1, the first optical characteristic is represented by a first illumination optical intensity, the second optical characteristic is represented by a second illumination optical intensity, the third optical characteristic is represented by a third illumination optical intensity.

3. The method of claim 2, the first illumination optical intensity equals the second illumination optical intensity.

4. The method of claim 2, the third illumination optical intensity is a factor "a" smaller than the second illumination optical intensity,
    the change in temperature is represented by:

$$\Delta T = C_{th}\left(\frac{I_3 - I_2}{a - 1} - I_1\right),$$

wherein, $\Delta T$ is the map of the change in temperature of the electromagnetically radiating device between the electrically un-energized and energized states, $I_3$ is a third reflection optical intensity associated with the third illumination optical intensity, $I_2$ is a second reflection optical intensity associated with the second illumination optical intensity, $I_1$ is a first reflection optical intensity associated with the first illumination optical intensity, and $C_{th}$ is a pixel-by-pixel thermoreflectance coefficient.

5. The method of claim 1, the first optical characteristic is represented by a first illumination wavelength, the second optical characteristic is represented by a second illumination wavelength, the third optical characteristic is represented by a third illumination wavelength.

6. The method of claim 5, the intensity of first reflected wavelength equals the intensity of second reflected wavelength.

7. The method of claim 5, the intensity of the third reflected wavelength is a factor "a" smaller than that of the intensity of second reflected wavelength,
    the change in temperature is represented by:

$$\Delta T = \left(\frac{C_{th,3}I_3 - C_{th,2}I_2}{a\left(\frac{C_{th,3}}{C_{th,1}}\right) - \left(\frac{C_{th,2}}{C_{th,1}}\right)} - C_{th,1}I_1\right),$$

wherein, $\Delta T$ is the map of the change in temperature of the electromagnetically radiating device between the electrically un-energized and energized states, $I_3$ is a third reflection optical intensity associated with the third illumination wavelength, $I_2$ is a second reflection optical intensity associated with the second illumination wavelength, $I_1$ is a first reflection optical intensity associated with the first illumination wavelength, and $C_{th,i}$ is a pixel-by-pixel thermoreflectance coefficient at wavelength i (i=1 for the first reflection, i=2 for the second reflection, i=3 for the third reflection).

8. The method of claim 1, illuminating the device comprises energizing at least one light emitting diode disposed about the electromagnetically radiating device.

9. The method of claim 1, illuminating the device comprises energizing at least one laser disposed about the electromagnetically radiating device.

10. The method of claim 9, the laser operates at wavelength ranging from about 300 nm to about 2000 nm, wherein about is within 10% of the corresponding value.

11. The method of claim 9, the laser has a wavelength of about 655 nm, wherein about is within 10% of the corresponding value.

12. The method of claim 9, the laser has an output power ranging from about 1 mW to about 100 mW, wherein about is within 10% of the corresponding value.

13. The method of claim 9, the laser has an output power of about 5 mW, wherein about is within 10% of the corresponding value.

14. The method of claim 1, capturing images performed by a camera disposed about the electromagnetically radiating device.

15. The method of claim 1, capturing images performed by at least one photodetector disposed about the electromagnetically radiating device.

16. The method of claim 15, the at least one detector is an array of photodetectors ranging in size from about 2×2 to about 256×256, wherein about is within 10% of the corresponding value.

17. The method of claim 1, the reference image is an average of a plurality of individual reference images captured in response to a plurality of optical signals each having the first optical characteristic.

18. The method of claim 17, the on image is an average of a plurality of individual on images captured in response to a plurality of optical signals each having the second optical characteristic.

19. The method of claim 17, the modified on image is an average of a plurality of individual modified on images captured in response to a plurality of optical signals each having the third optical characteristic.

* * * * *